S. Clark.
Churn.
X 8777
Patented Apr. 22, 1836.
BEST AVAILABLE COPY
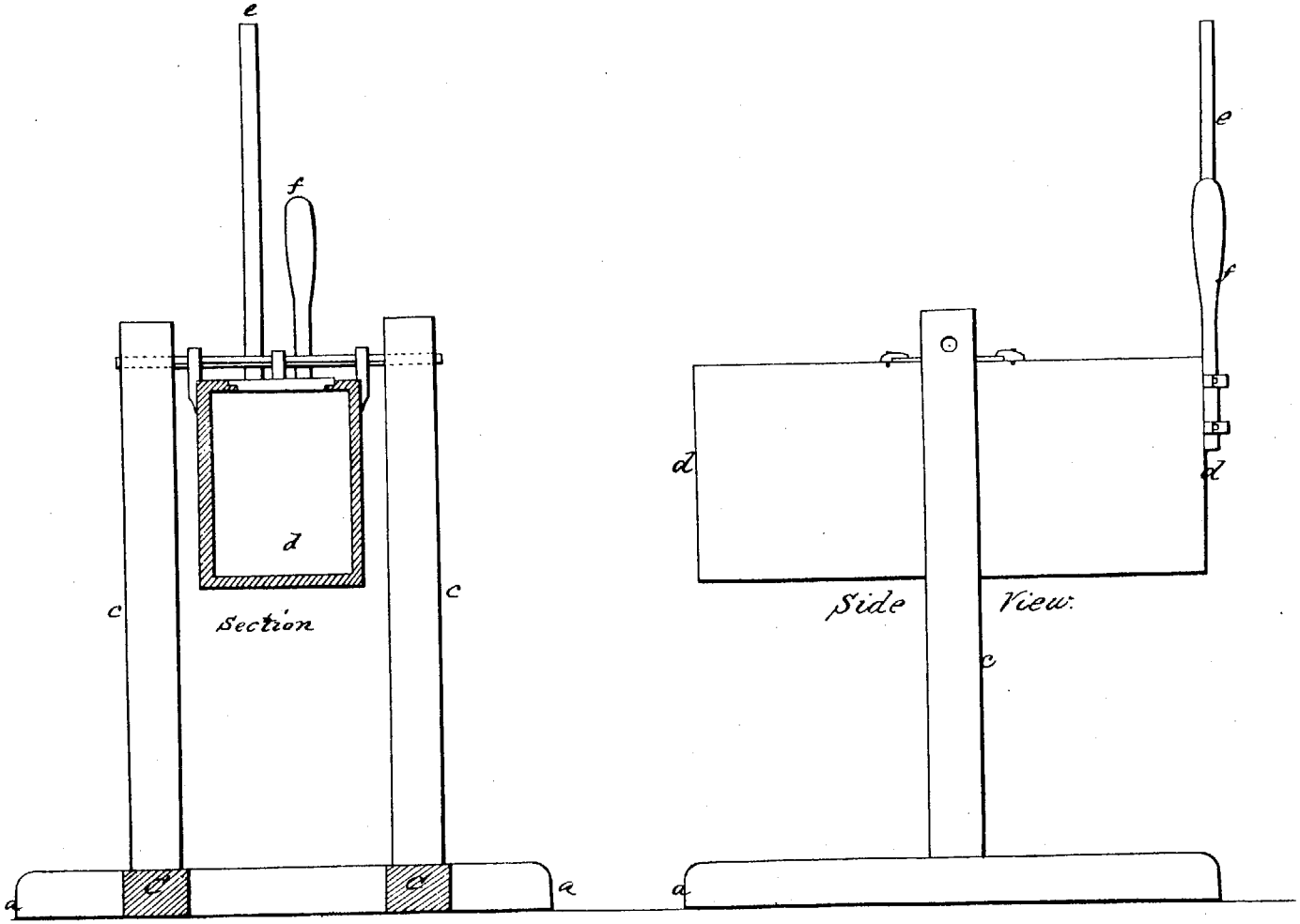

An. 12
Apl. 22. 1835
563.
8777X

Samuel Clark, of Parkman State of Maine

Letters Patent,

The schedule referred to in these Letters Patent and making part of the same containing a description in the words of the said Samuel Clark, himself of his improvement in the Churning Machine To all to whom these presents shall come Be it known that I Samuel Clark of Parkman in the County of Sommersett, & State of Maine, have invented a new and useful improvement, in a Churning Machine and that the following is a full and exact description of the construction & operation of the said Machine as improved by me, First make two cills about two and half feet long two cross pieces of equal length to frame the cills together the cills the cills are framed about fifteen inches apart. then make a mortis on the upper side of the cills in the centre these are to receive a post in each, about two and a half feet long, standing erect - near the top of theese posts are a perforation through each post, then a box is made two and half feet long of pine or hard wood boards, this box is about ten inches wide and twelve inches deep - the box is put togather water tight an aperture is made in the top of the box in the centre about six inches square to receive the cream a cover or lid is made to to correspond with the aperture & is fastened by two buttons that are afixed on the two corners of this aperture - a pin or handle is fixed in the centre of the cover, to remove it by - four perferations are made in the cover to give circulation of air to the cream if found necessary; two cleets are attached on one side of the box forming sockets near the centre of the box, a small post is made, and Drawing made one end enters those sockets standing erect, this stick is about two feet long, in the centre and on each side of the box at the upper edge are a cleet fastened in a erect position with three perferations in each of them, a pin is fixed into each of those cleets, - two cleets are made forming sockets and fastned at one end of the box - on the top of the box on the same side of the box that the upright post is fixed to a handle, is made and fixed in those cleets - the box is then hung up to those upright posts above described in the frame by the pins described on each side of the box and is on shifed as occasion may require - Opperation is by takeing hold of the upright piece attached to the box - or the handle placed to the end of the box its opperation by tipping it each way allmost perpendicular, the improvement that I claim is the manner of hangin it & its opperating end ways, a perferation is made through the end of this box to draw the butter milk off Witness
Levi W. Merril
James M. Merril Samuel Clark, 564 [illegible]

[illegible]